United States Patent [19]

Franz, Jr.

[11] Patent Number: 4,471,277
[45] Date of Patent: Sep. 11, 1984

[54] VEHICLE PROPULSION MOTOR CONTROL APPARATUS

[75] Inventor: James H. Franz, Jr., Pleasant Hills, Pa.

[73] Assignee: Westinghouse Electric Corp., Pittsburgh, Pa.

[21] Appl. No.: 373,467

[22] Filed: Apr. 30, 1982

[51] Int. Cl.³ .............................................. H02P 3/14
[52] U.S. Cl. ................................... 318/376; 318/258; 318/269; 318/345 C
[58] Field of Search ................ 318/376, 258, 269, 345

[56] References Cited

U.S. PATENT DOCUMENTS 4,319,170  3/1982  Brent .................................. 318/376

FOREIGN PATENT DOCUMENTS

| 56-58704 | 5/1981 | Japan | 318/376 |
| 57-78382 | 5/1982 | Japan | 318/376 |
| 57-88884 | 6/1982 | Japan | 318/376 |
| 2062379 | 5/1981 | United Kingdom | 318/376 |

Primary Examiner—B. Dobeck
Assistant Examiner—Bentsu Ro
Attorney, Agent, or Firm—R. G. Brodahl

[57]     ABSTRACT

A motor control apparatus operative with a voltage source and including thyristor switch devices arranged in a bridge circuit for selectively determining forward and reverse operation of a DC series motor coupled with a vehicle, said control apparatus having provision for regenerative braking of the motor to provide current back into the voltage source.

4 Claims, 7 Drawing Figures

| THYRISTOR DEVICES → | 70 | 72 | 74 | 76 |
|---|---|---|---|---|
| (FIG.3) FORWARD POWER | X |  | X |  |
| (FIG.4) REVERSE POWER |  | X |  | X |
| (FIG.5) FORWARD BRAKE |  | X |  |  |
| (FIG.6) REVERSE BRAKE | X |  |  |  |

FIG. 7

VEHICLE PROPULSION MOTOR CONTROL APPARATUS

CROSS-REFERENCE TO RELATED PATENT

The present application is related to U.S. Pat. No. 4,284,930 of T. C. Matty and entitled "Motor Control Apparatus And Method", which is assigned to the same assignee as the present application and the disclosure of which is incorporated herein by reference.

BACKGROUND OF THE INVENTION

It is known in the prior art to control the speed of a vehicle propulsion direct current series motor by a chopper apparatus including a thyristor switch device in series with the motor, as shown in U.S. Pat. Nos. 3,769,566 and 4,284,930. Speed control of the motor is provided by varying the width of voltage pulses supplied to the motor such that the resulting average power applied to the motor establishes the operational speed thereof. A commutation circuit including a charge capacitor has been used to provide a biased voltage across a conducting thyristor device for commutating the conduction of that thyristor device. A propulsion motor is operative in a motoring mode when the passenger vehicle is being propelled or accelerated along a track and in a brake mode when the vehicle is being stopped or decelerated.

As described in a published article in the *Westinghouse Engineer* for March 1973 at pp. 34–41 the average voltage applied to the motor armature is controlled by adjusting the ratio of chopper OFF-time to the chopper ON-time with the resulting average motor armature current determining the motor torque for moving the vehicle along the track.

In the motoring or power mode of operation the motors of a vehicle are connected in relation to a direct current voltage source such that current is supplied through a chopper when the chopper is ON and through the motors to ground. When the chopper is turned OFF, the energy stored in the motor reactor and the inductance of the motor field maintains current flow in the motor circuit through a freewheeling diode. In the brake or deceleration mode of operation the motors in the prior art were reconnected by mechanical reverser switches with the motor operative as self-excited generators to provide dynamic or regenerative braking of the vehicle. With the chopper ON the motor current increases and with the chopper off the current is forced into the power supply through the free-wheeling diode by the motor reactor.

SUMMARY OF THE INVENTION

The armature of a DC series propulsion motor is energized by a chopper to regulate the motor current and is connected in a bridge circuit that selectively enables one of forward and reverse vehicle operation, with current controlled diodes being included to provide regenerative braking of the vehicle and the supply of the motor current back to the power supply line.

BRIEF DESCRIPTION OF THE DRAWINGS

FIG. 7 is an operational chart illustrating the controlled operation of the selected thyristor switch devices to provide the desired operation of the motor circuit as here described.

DESCRIPTION OF THE PREFERRED EMBODIMENT

Figure 1:
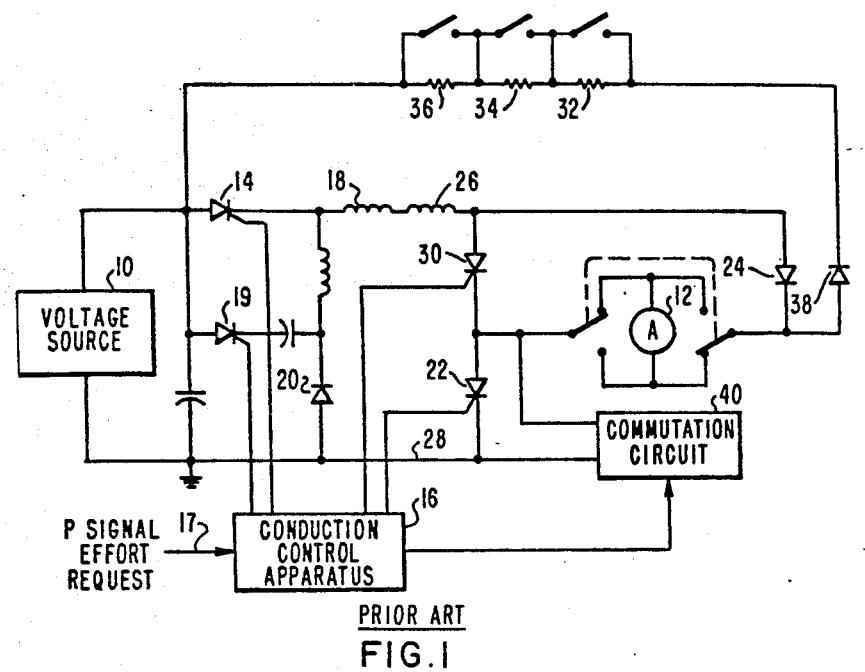
FIG. 1 shows a prior art DC motor control apparatus as described in U.S. Pat. No. 4,284,930.

In FIG. 1 there is shown a direct current motor control apparatus for determining the average current supplied from a direct current voltage source 10 to a direct current motor armature 12 and including a series main thyristor switch device 14 that repetitively operates in an ON condition and an OFF condition to chop and regulate the voltage applied to the motor armature 12, shown connected in a well-known reverser circuit arrangement. The control of this voltage is determined by changing the ON operation time in relation to the OFF operation time of the conduction by the main thyristor 14 for controlling the speed of the motor 12. The speed of a DC series field traction motor is proportional to the armature voltage and inversely proportional to the field current or field flux in accordance with the relationship that speed S is proportional to the armature voltage E divided by the field flux $\phi$. To reduce the speed of the motor armature 12 the armature voltage is decreased, and to increase the motor speed the armature voltage is increased. The voltage source 10 for a typical traction motor application can be a relatively constant direct current voltage source such as 600 volts from a central power station as is well known to persons skilled in this art. The main thyristor switch 14 is gated by a conventional conduction control apparatus 16 in response to a P signal effort request input 17 to become conductive and is subsequently commutated by the commutation thyristor 19 to become not conductive as required to provide a desired average voltage across the motor armature 12 which determines the motor speed. Each time the main thyristor switch 14 conducts the voltage across the motor armature 12 and the motor reactor 18 rises to the voltage of the voltage source 10. Each time the main thyristor 14 blocks, the voltage across the motor armature and the motor reactor 18 falls to zero. The motor 12 responds to the average motor voltage. If the main thyristor switch 14 remains conductive for a longer time period, this raises the average motor voltage and if the main thyristor switch 14 remains non-conductive for a longer time period, this lowers the average motor voltage. The motor current increases each time the thyristor switch 14 becomes conductive and then decreases each time the main thyristor switch 14 becomes not conductive. The average motor current is proportional to the torque of the motor 12. The freewheeling diode 20 allows the motor current to continue due to the inductance of the motor circuit after the main thyristor switch 14 becomes non-conductive.

A power thyristor switch 22 is made conductive when it is desired for the motor circuit to operate in the power or acceleration mode for the propulsion of the vehicle coupled with the motor armature 12. A power diode 24 and a motor field winding 26 are connected in the power mode circuit including the power thyristor switch 22, the return conductor 28, the voltage source 10 and the main thyristor switch 14. A brake thyristor switch 30 is made conductive when it is desired for the motor circuit to become operative in the brake or deceleration mode. When dynamic braking is desired one or more of the braking resistors 32, 34 and 36 are included in the brake circuit including the brake diode 38. A well-known commutation circuit 40 is operative to terminate the conduction of the power thyristor switch 22 when it is desired for the motor circuit to operate in the brake mode with the brake current flowing through the brake thyristor switch 30 and the motor armature 12.

The power thyristor switch 22 is made conductive when the motor circuit is desired to operate in the power mode for the propulsion of the vehicle coupled with the motor armature 12. This causes current to flow through the power diode 24, the motor field 26 and the motor reactor 18 from the main thyristor 14 to the ground return conductor 28 connected with the voltage source 10. The conduction control of the main thyristor 14 can now modulate and determine the average current flow in the circuit including motor armature 12. When the main thyristor switch 14 is not conductive the energy stored in the motor reactor 18 and the field winding 26 maintains the current flow in the motor armature 12 through the freewheeling diode 20.

The brake thyristor switch 30 is made conductive when the motor circuit is desired to operate in the brake mode for dynamic or regenerative braking of the vehicle coupled with the motor armature 12. With the main thyristor 14 conducting the brake mode current flows from the generating motor armature 12 through any of the brake resistors 32, 34 and 36 that are not short circuited to determine the desired level of dynamic braking effort as well known to persons skilled in this art, and through the brake diode 38, the main thyristor 14, the motor reactor 18 and the motor field 26 through the brake thyristor 30 and through the motor armature 12. This provides current through the motor field 26 in the brake mode as determined by the conductivity control of the main thyristor 14 of the motor control apparatus for the motor 12, with the motor acting as a generator in the brake mode and producing an output voltage of opposite polarity in relation to the voltage source 10. Since the field current remains substantially the same in the power mode and in the brake mode, this maintains the EMF voltage polarity for the generating armature 12. The current flow direction through the motor armature 12 changes in a brake mode as compared to the power mode.

In the brake mode with the main thyristor 14 not conducting, the current will flow through a circuit including the voltage source 10, the freewheeling diode 20, the motor reactor 18, the motor field 26, the brake thyristor 30, the motor armature 12 and any of the resistors 32, 34 and 36 that are not short circuited and through the brake diode 38 to regenerate the power into the voltage source 10.

In reference to the motor control circuit shown in FIG. 1, when the desired vehicle operation requires changing from the power mode with the power thyristor 22 conducting to the brake mode with the brake thyristor 30 conducting, the brake thyristor 30 can be made conducting before the power thyristor 22 is made non-conducting such that both the power thyristor 22 and the brake thyristor 30 are conducting at the same time. This establishes a current path from the voltage source 10 and through the main control thyristor 14, the motor reactor 18, the field winding 26, the brake thyristor 30, the power thyristor 22 and the ground returns conductor 28 back to the voltage source 10 to provide a controlled current path through the motor reactor 18 and the motor field 26, and permits bringing the flux of the field winding up to a predetermined and known level before each changeover from the power mode to the brake mode such that a desired brake current build is then provided even if the previous power mode current level was very low.

To provide the desired control of the motor for particularly low vehicle operating speeds a force-commutation circuit 40 is provided for the power thyristor 22. When both the brake thyristor 30 and the power thyristor 22 are conducting during the transition from power mode to the brake mode of operation, the commutation circuit 40 can be operated to stop the conduction of the power thyristor 22. The current flow through the inductance of the motor reactor 18 and the field winding 26 will now continue to flow as brake current through the motor armature 12 to provide, in effect, a very rapid changeover from the power mode to the brake mode of operation. Because of the provision of the commutation circuit 40, brake mode operation is available down to very low vehicle speeds of operation with assured brake current buildup at much lower speeds and lower motor circuit currents than could be provided without this feature of operation. In addition, the main thyristor 14 can determine the magnitude of this brake current before the power thyristor 22 is commutated to establish at least the initial brake effort provided by the motor 12.

Figure 2:
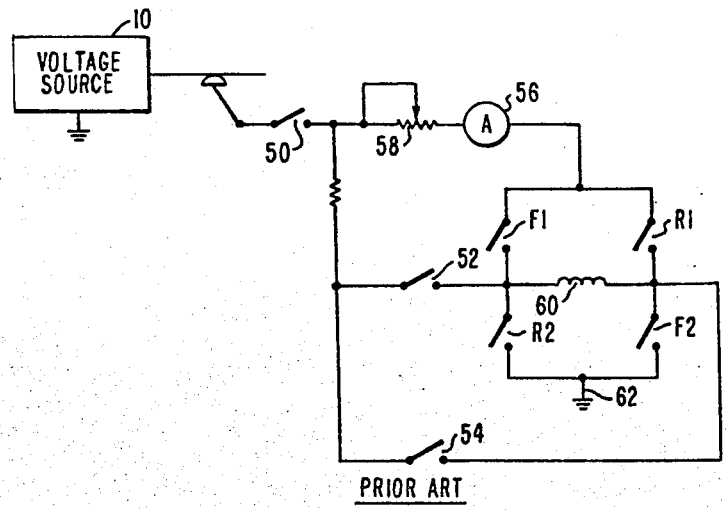
FIG. 2 shows a prior art trolley coach propulsion motor control apparatus.

In FIG. 2 there is shown a prior art trolley coach motor control apparatus including contactor switches to provide forward and reverse operation of a propulsion motor. With the line switch 50 closed and the brake contacts 52 and 54 open the motor armature 56 for power operation is energized through an operator-adjustable speed control resistor 58 and the field winding 60 in one of a forward power direction through closed contacts F1 and F2 or a reverse power direction through closed contacts R1 and R2 to the ground connection 62. For brake operation the line switch 50 is open and one of the contacts 52 is closed for forward brake operation or the contact 54 is closed for reverse brake operation.

Figure 3:
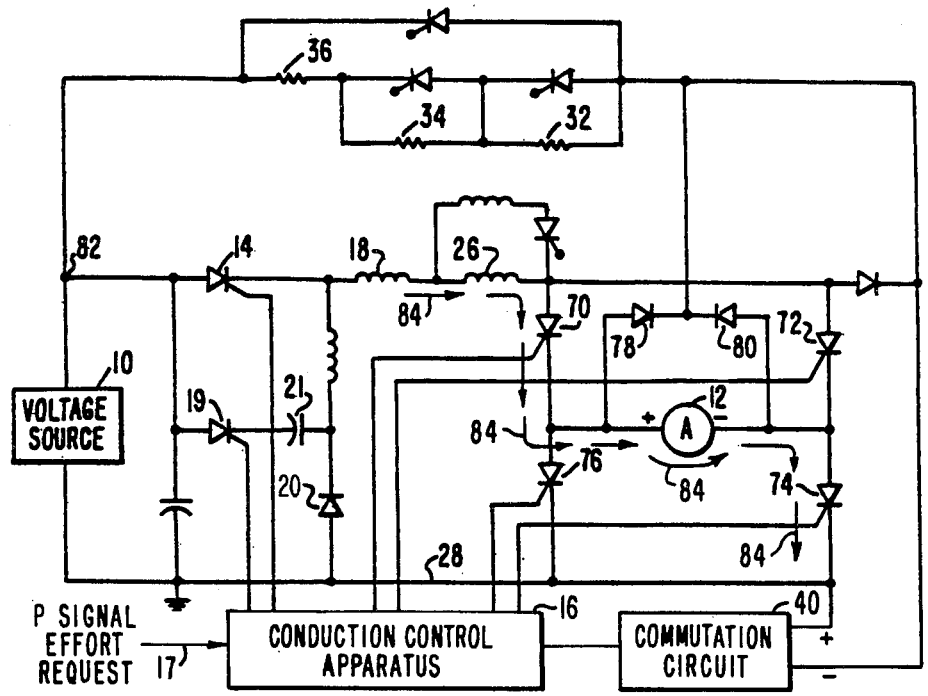
FIG. 3 shows the motor control apparatus in accordance with the present invention and with a motor current illustration for the forward power operation of the motor.

In FIG. 3 there is shown one operation of the motor control apparatus in accordance with the present invention. The chopper portion of the control apparatus includes the main thyristor switch device 14 operative with power supply 10 to regulate the current flow through the motor armature 12, the motor reactor 18, the motor field 26, the freewheeling diode 20, the commutation thyristor 19 and the commutation capacitor 21. The motor control circuit includes the forward control thyristor 70, the reverse control thyristor 72, the forward power thyristor 74 and the reverse power thyristor 76 connected in a bridge arrangement with the motor armature 12. A forward brake diode 78 and a reverse brake diode 80 are connected from respective sides of the armature 12 through the brake resistors 32, 34 and 36 to the connection 82 with the power supply 10 and the main thyristor 14. A conventional and well-known conduction control apparatus 16 is provided to fire the respective thyristors as required to provide the desired operation of the motor control apparatus. A conventional and well-known commutation circuit 40 is connected across the bridge arrangement to terminate the conduction of all the thyristors 70, 72, 74 and 76 when desired.

In FIG. 3 there is shown by arrow 84 the current flow provided for the forward power operation of the motor armature 12 with the forward control thyristor 70 and the forward power thyristor 74 made conducting by the conduction control apparatus 16.

Figure 4:
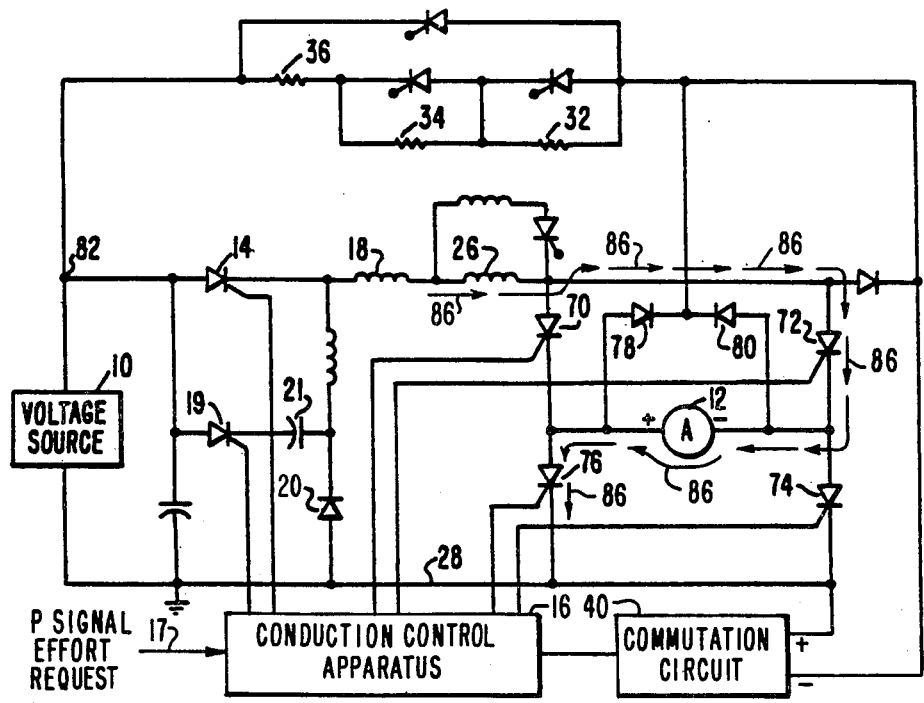
FIG. 4 shows the present motor control apparatus with a motor current illustration for the reverse power operation of the motor.

In FIG. 4 there is shown by arrow 86 the current flow provided for reverse power operation of the motor armature 12 with the reverse control thyristor 72 and the reverse power thyristor 76 made conducting by the conduction apparatus 16.

Figure 5:
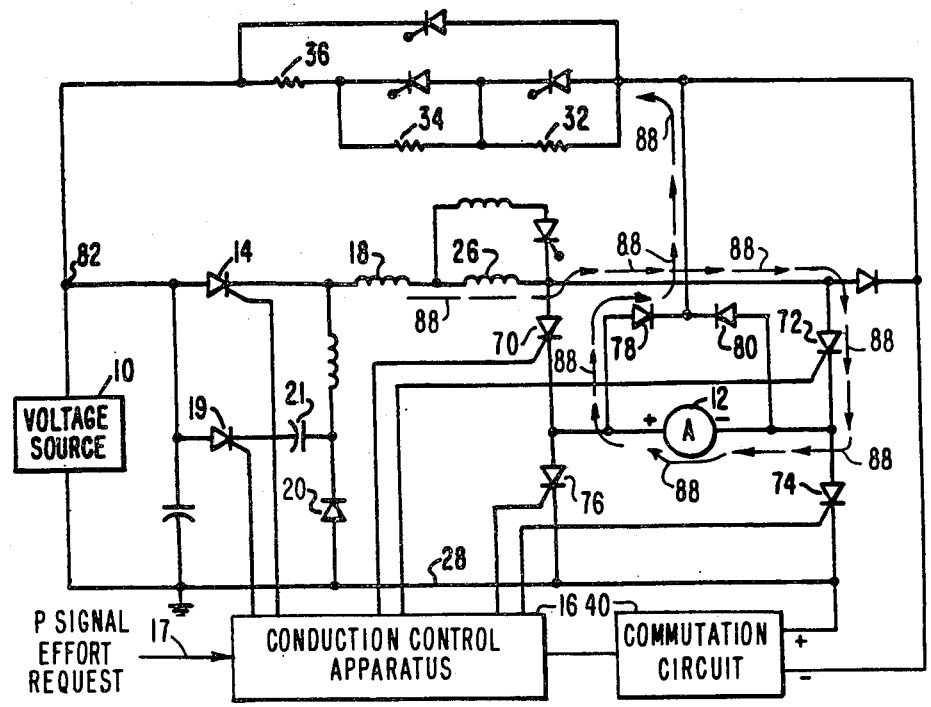
FIG. 5 shows the present motor control apparatus with a motor current illustration for the forward brake operation of the motor.

In FIG. 5 there is shown by arrow 88 the current flow provided for the forward brake operation of the motor armature 12 with the control thyristor 72 made conducting by the conduction control apparatus 16 and the forward brake diode 78 conducting such that the current flows through the brake resistors 32, 34 and 36 to the circuit connection 82.

Figure 6:
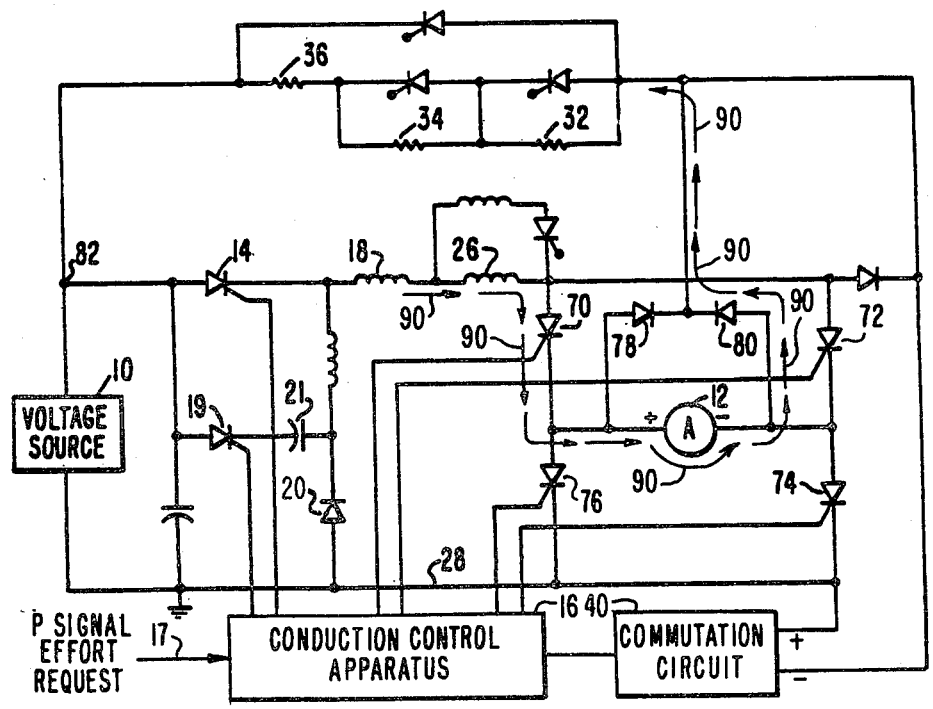
FIG. 6 shows the present motor control apparatus with a motor current illustration for the reverse brake operation of the motor.

In FIG. 6 there is shown by arrow 90 the current flow provided for reverse brake operation of the motor armature 12, with the control thyristor 70 made conducting by the conduction control apparatus 16 and the reverse brake diode 80 conducting the current through the brake resistors 32, 34 and 36 to the circuit connection 82.

In FIG. 7 there is provided an operational chart to illustrate the desired control operation of the thyristor switches 70, 72, 74 and 76 to be made conductive by the conduction control apparatus 16 to provide the respective motor operations as may be desired. After the commutation circuit 40 is fired to commutate each of the thyristor switches 70, 72, 74 and 76, the conduction control apparatus 16 then selectively fires the thyristor switches as shown in FIG. 7 to provide the desired operation of the motor armature 12. Firing of the thyristor switches 70 and 74 provides a forward power operation as shown in FIG. 3 for the motor armature 12. Firing of the thyristor switches 72 and 76 provides a reverse power operation as shown in FIG. 4 for the motor armature 12. Firing of the thyristor switch 72 provides a forward brake operation as shown in FIG. 5 for the motor armature 12. Firing of the thyristor switch 70 provides a reverse brake operation as shown in FIG. 6 for the motor armature 12.

The motor circuit arrangement shown in FIGS. 5 and 6 enables regeneration of motor current to the voltage source 10 during brake operation of the motor armature 12. Thusly, full power and full brake operation of the motor circuit for each of forward and reverse vehicle operation is provided.

In brake operation, regeneration of current to the voltage source 10 is provided when the main thyristor 14 turns OFF. For example, with the main thyristor 14 turned ON the brake current in the forward conduction mode shown in FIG. 5 conducts from the armature 12 through the brake resistors 32, 34 and 36, through the main thyristor 14, the motor reactor 18, the motor field 26 and the forward control thyristor 72. With the main thyristor switch 14 turned OFF, the brake current conducts from the motor armature 12 through the brake resistors 32, 34 and 36 through the voltage source 10, the freewheeling diode 20, the motor reactor 18, the motor field 26 and the forward control thyristor 72. The diodes 78 and 80 prevent current from the voltage source 10 feeding back into the brake motor circuit.

I claim:

1. In control apparatus for a motor including a field winding and an armature, said control apparatus being operative with a voltage source connected to a brake resistor for determining one of a power mode of operation and a brake mode of operation in each of a forward and reverse direction, the combination of:
    current control means including chopper means connected in series with said field winding between the voltage source and said armature to regulate the current flow through the armature and the field winding;
    a motor circuit having first control switch means connected between the chopper and a first end of the armature and second control switch means connected between the chopper and a second end of the armature;
    brake control means including a first diode connected between said first end of the armature and said brake resistor and a second diode connected between said second end of the armature and said brake resistor;
    and conduction control means providing forward power operation of the motor by determining the conductivity of the first control switch means, providing reverse power operation of the motor by determining the conductivity of the second control switch means, providing forward brake operation of the motor by determining the conductivity of the second control switch means through the armature and the first diode and providing reverse brake operation of the motor by determining the conductivity of the first control switch means through the armature and the second diode.

2. The control apparatus of claim 1, with said motor circuit including forward power switch means connected to the second end of the armature and reverse power switch means connected to the first end of the armature;
    with said conduction control means providing the forward power operation by determining the conductivity of each of the first control switch means and the forward power switch means; and
    with said conduction control means providing the reverse power operation by determining the conductivity of each of the second control switch means and the reverse power switch means.

3. The control apparatus of claim 1, with said chopper means connected between the voltage source and said motor circuit, said chopper means having an ON condition of operation when brake power generated by said motor is supplied to the brake resistor and an OFF condition of operation when brake power generated by said motor is supplied to said voltage source.

4. The control apparatus of claim 1, with said chopper means for determining the supply of current generated by the motor during brake mode of operation to said voltage source.

* * * * *